(12) United States Patent
Cowelchuk et al.

(10) Patent No.: US 10,093,268 B2
(45) Date of Patent: *Oct. 9, 2018

(54) TRIM COMPONENT FOR VEHICLE INTERIOR

(71) Applicant: Shanghai Yanfeng Jinqiao Automotive Trim Systems Co., Ltd., Plymouth, MI (US)

(72) Inventors: Glenn A Cowelchuk, Holland, MI (US); Bart W Fox, Zeeland, MI (US); Jeffrey A Deyoung, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/331,578

(22) Filed: Oct. 21, 2016

(65) Prior Publication Data

US 2017/0036638 A1 Feb. 9, 2017

Related U.S. Application Data

(63) Continuation-in-part of application No. 14/424,671, filed as application No. PCT/US2013/056751 on Aug. 27, 2013, now Pat. No. 9,481,337.
(Continued)

(51) Int. Cl.
*B60R 21/215* (2011.01)
*B60R 21/2165* (2011.01)
(Continued)

(52) U.S. Cl.
CPC ........ *B60R 21/215* (2013.01); *B29C 37/0057* (2013.01); *B29C 45/0081* (2013.01);
(Continued)

(58) Field of Classification Search
CPC .......... B60R 21/215; B60R 2021/2171; B29C 45/14336; B29L 2031/3038
See application file for complete search history.

(56) References Cited

U.S. PATENT DOCUMENTS

| 2,903,388 A | 9/1959 | Jonke et al. |
| 4,015,872 A | 4/1977 | Loznak et al. |

(Continued)

FOREIGN PATENT DOCUMENTS

| CA | 939473 A1 | 1/1974 |
| CA | 977113 A1 | 11/1975 |

(Continued)

OTHER PUBLICATIONS

Non-Final Office Action from the United States Patent Office for U.S. Appl. No. 14/424,671 dated Jul. 31, 2015.
(Continued)

*Primary Examiner* — Faye M Fleming

(57) ABSTRACT

A vehicle interior component is disclosed. The component may be a trim component configured to support an airbag module providing an airbag configured to be deployed through an opening into the vehicle interior. The trim component may comprise a panel comprising a first material and providing a front side and a back side; and a structure formed from a second material molded on the back side of the panel. The panel may comprise a compression-formed component. The compression-formed component may be configured to provide the opening through a door established upon deployment of the airbag to facilitate deployment of the airbag. The structure may be configured to support the airbag module and to direct the airbag toward the door during deployment of the airbag. The compression-formed component may comprise a feature formed within the panel configured to establish the opening at the door to be created by the airbag at the feature upon deployment of the airbag (Continued)

from the airbag module so that the airbag will deploy through the panel at the opening. A method of manufacturing a vehicle trim component is also disclosed. The method includes disposing a fiber panel within a mold cavity and aligning an airbag chute assembly with the fiber panel and compressing the fiber panel within the mold cavity to form the fiber panel into a desired shape. At least a portion of the fiber panel is compressed between a surface of the mold cavity and a surface of the airbag chute assembly.

20 Claims, 8 Drawing Sheets

Related U.S. Application Data

(60) Provisional application No. 61/693,634, filed on Aug. 27, 2012.

(51) Int. Cl.
| | | |
|---|---|---|
| *B60R 13/02* | (2006.01) | |
| *B29C 45/00* | (2006.01) | |
| *B29C 45/16* | (2006.01) | |
| *B29C 37/00* | (2006.01) | |
| *B29L 31/30* | (2006.01) | |
| *B29C 43/00* | (2006.01) | |
| *B29K 105/04* | (2006.01) | |
| *B29C 45/14* | (2006.01) | |

(52) U.S. Cl.
CPC .......... *B29C 45/1671* (2013.01); *B60R 13/02* (2013.01); *B60R 21/2165* (2013.01); *B29C 43/003* (2013.01); *B29C 45/14786* (2013.01); *B29K 2105/04* (2013.01); *B29L 2031/3038* (2013.01); *B60R 2013/0287* (2013.01)

(56) References Cited

U.S. PATENT DOCUMENTS

| | | | |
|---|---|---|---|
| 4,124,242 A | 11/1978 | Canner | |
| 4,576,560 A | 3/1986 | Herman | |
| 4,766,025 A | 8/1988 | Sanok et al. | |
| 4,959,004 A | 9/1990 | Nowakowski | |
| 5,091,131 A | 2/1992 | Schumacher et al. | |
| 5,370,518 A | 12/1994 | Sasaki et al. | |
| 5,372,767 A | 12/1994 | Zimmermann et al. | |
| 5,679,301 A | 10/1997 | Miklas et al. | |
| 5,756,406 A | 5/1998 | Rittman et al. | |
| 5,804,117 A | 9/1998 | Baba et al. | |
| 5,902,533 A | 5/1999 | Munger et al. | |
| 5,968,437 A | 10/1999 | Harada | |
| 5,968,439 A | 10/1999 | Grove | |
| 6,079,733 A | 6/2000 | Towler | |
| 6,439,871 B1 | 8/2002 | Saito et al. | |
| 6,537,669 B1 | 3/2003 | Kaufmann | |
| 6,685,863 B1 | 2/2004 | Yabushita et al. | |
| 6,739,856 B2 | 5/2004 | Cesano | |
| 6,756,003 B2 | 6/2004 | Kieltyka et al. | |
| 6,893,247 B2 | 5/2005 | Uytterhaeghe et al. | |
| 7,014,208 B2 | 3/2006 | DePue et al. | |
| 7,186,105 B2 | 3/2007 | Cesano | |
| 7,241,412 B2 | 7/2007 | Cesano | |
| 8,474,861 B1 | 7/2013 | Twork | |
| 8,939,745 B2 | 1/2015 | Fox et al. | |
| 9,010,800 B1 | 4/2015 | Hunter | |
| 9,149,961 B2 | 10/2015 | Fox et al. | |
| 9,481,337 B2 * | 11/2016 | Cowelchuk | B60R 21/215 |
| 2002/0042235 A1 | 4/2002 | Ueno et al. | |
| 2005/0121818 A1 | 6/2005 | Cowelchuk et al. | |
| 2007/0290542 A1 | 12/2007 | Wada | |
| 2008/0292851 A1 | 11/2008 | Egerer et al. | |
| 2009/0226676 A1 | 9/2009 | Smith et al. | |
| 2009/0250909 A1 | 10/2009 | Kuhne et al. | |
| 2013/0229024 A1 | 9/2013 | Schidan et al. | |

FOREIGN PATENT DOCUMENTS

| | | |
|---|---|---|
| CA | 1138161 A1 | 12/1982 |
| CA | 1239336 A1 | 7/1988 |
| CA | 1258561 A1 | 8/1989 |
| CA | 2013848 A1 | 10/1990 |
| CA | 2018966 A1 | 12/1990 |
| CA | 2020235 A1 | 12/1990 |
| CA | 2018882 A1 | 2/1991 |
| CA | 2035921 A1 | 9/1991 |
| CA | 1291603 | 11/1991 |
| CA | 2085478 A1 | 1/1992 |
| CA | 1314366 | 3/1993 |
| CA | 1318502 | 6/1993 |
| CA | 2137347 A1 | 3/1994 |
| CA | 2143004 A1 | 6/1994 |
| CA | 2119694 A1 | 9/1994 |
| CA | 2156050 A1 | 9/1994 |
| CA | 2156061 A1 | 9/1994 |
| CA | 2168221 A1 | 2/1995 |
| CA | 2187446 A1 | 8/1996 |
| CA | 2175309 A1 | 11/1996 |
| CA | 2223779 A1 | 12/1996 |
| CA | 2318251 A1 | 7/1999 |
| CA | 2318554 A1 | 7/1999 |
| CA | 2269308 A1 | 10/1999 |
| CA | 2334853 A1 | 12/1999 |
| CA | 2317301 A1 | 3/2001 |
| CA | 2400641 A1 | 8/2001 |
| CA | 2341002 A1 | 9/2001 |
| CA | 2322343 A1 | 4/2002 |
| CA | 2424081 A1 | 4/2002 |
| CA | 2380114 A1 | 10/2003 |
| CA | 2509350 A1 | 6/2004 |
| CA | 2528219 A1 | 12/2004 |
| CA | 2557584 A1 | 9/2005 |
| CA | 2570816 A1 | 1/2006 |
| CA | 2570831 A1 | 1/2006 |
| CA | 2589120 A1 | 6/2006 |
| CA | 2591390 A1 | 7/2006 |
| CA | 2602166 A1 | 9/2006 |
| CA | 2568770 A1 | 6/2007 |
| CA | 2634260 A1 | 7/2007 |
| CA | 2648601 A1 | 10/2007 |
| CA | 2647317 A1 | 11/2007 |
| CA | 2647658 A1 | 11/2007 |
| CA | 2651595 A1 | 11/2007 |
| CA | 2653322 A1 | 12/2007 |
| CA | 2658572 A1 | 5/2008 |
| CA | 2672235 A1 | 7/2008 |
| CA | 2674316 A1 | 7/2008 |
| CA | 2674390 A1 | 7/2008 |
| CA | 2674457 A1 | 7/2008 |
| CA | 2675855 A1 | 7/2008 |
| CA | 2689506 A1 | 12/2008 |
| CA | 2695245 A1 | 2/2009 |
| CA | 2733552 A1 | 2/2009 |
| CA | 2707083 A1 | 7/2009 |
| CA | 2756724 A1 | 10/2010 |
| CA | 2757214 A1 | 10/2010 |
| CA | 2772425 A1 | 4/2011 |
| CA | 2802119 A1 | 12/2011 |
| CA | 2847272 A1 | 3/2013 |
| CN | 101336157 A | 12/2008 |
| CN | 101678811 A | 3/2010 |
| CN | 101959724 A | 1/2011 |
| DE | 3614533 A1 | 11/1987 |
| DE | 10052693 A1 | 5/2001 |
| DE | 102004054228 A1 | 6/2006 |
| DE | 102009055983 | 6/2011 |
| DE | 102006000657 B4 | 9/2014 |
| EP | 0748722 A2 | 12/1996 |
| EP | 1410958 A1 | 4/2004 |
| EP | 2006166 A1 | 12/2008 |
| FR | 2445208 | 7/1980 |

(56) References Cited

FOREIGN PATENT DOCUMENTS

| | | | |
|---|---|---|---|
| JP | H07195372 A | 8/1995 | |
| JP | H08142059 A | 6/1996 | |
| JP | 11207768 A | 8/1999 | |
| JP | 2002104125 A | 4/2002 | |
| JP | 2003154915 A | 5/2003 | |
| JP | 2004136698 A | 5/2004 | |
| JP | 2004314501 A | 11/2004 | |
| JP | 2007283845 A | 11/2007 | |
| JP | 2008012838 A | 1/2008 | |
| JP | 2008254438 A | 10/2008 | |
| JP | 2010047207 A | 3/2010 | |
| JP | 2010069854 A | 4/2010 | |
| JP | 2010173637 A | 8/2010 | |
| WO | 9902321 A1 | 1/1999 | |
| WO | 2013033024 A2 | 3/2013 | |
| WO | 2016077773 A1 | 5/2016 | |

OTHER PUBLICATIONS

Final Office Action from the United States Patent Office for U.S. Appl. No. 14/424,671 dated May 11, 2015.
Korean Office Action for Application No. 10-2015-7007823 dated Jul. 20, 2016 with English language summary.
International Search Report and Written Opinion for International Application No. PCT/US2013/056751 dated Nov. 15, 2013.
Materials from website/Internet: "Kante inbegriffen—One-Shot Hybridtechnik" http://www.frimo.com/de/news/frimo-unsere-news/anzeigen/kante-inbegrifen-one-shot-hybridtechnik.html (Date accessed Oct. 21, 2016).
Materials from website/Internet: "ZF erhält Composite Innovations Award 2011 für ein Leichtbau-Bremspedal" http://www.lightweight-design.de/index.php;do=show/site=lwd/sid=1630548824562f52b361d6a485111468/alloc=135/id=13987 (Date accessed Oct. 21, 2016).
Materials from website/Internet: "Presseinformationen FiberForm—Umformen und Hinterspritzen von Organblechen" http://www.kraussmaffei.com/de/presseinformationen/d/FiberForm.html (Date accessed Oct. 21, 2016).
Materials from website/Internet: "Institut für Verbundwerkstoffe GmbH Kaiserslautern" http://www.ivw.uni-kl.de/forschung-entwicklung/projekte/abbgeschlossene-projekte-auswahl/spriform/?_sm_au_=iVVMTSsQV1J2D23N (Date accessed Oct. 21, 2016).
Materials from website/Internet: "Hybrid Molding" http://bond-laminates.com/en/technology/processing-options/hybrid-molding/ (Date accessed Oct. 21, 2016).
Materials from website/Internet: Leichtbauteile spritzgieben http://www.arburg.com/fileadmin/redkation/mediathek/prospecte/arburg_leightbau_681228_de/# (Date accessed Oct. 21, 2016).
Materials from website/Internet: "K 2013: Engel and a plastic brake pedal" https://www.youtube.com/watch?v=30CJrOrSrt4 (Date accessed Oct. 21, 2016).
Materials from website/Internet: "Frimo: One-Shot Hybridtechnik—Kante inbegriffen" http://www.k-aktuell.de/frimo-one-shot-hybridtechnik-kante-inbegriffen-18956/ (Date accessed Oct. 21, 2016).
Materials from website/Internet: http://news.directindustry.de/press/frimo-group-gmbh/clever-kombiniert-verformen-hinterspritzen-einern-schritt-36161-404953.html (access unavailable Oct. 21, 2016).

International Search Report for International Application No. PCT/US2012/052534 dated Feb. 19, 2013.
Written Opinion of the International Searching Authority for International Application No. PCT/US2012/052534 dated Feb. 19, 2013.
International Search Report for International Application No. PCT/US2015/060710 dated Jan. 29, 2016.
Written Opinion of the International Searching Authority for International Application No. PCT/US2015/060710 dated Jan. 29, 2016.
International Preliminary Report on Patentability for International Application No. PCT/US2012/052534 dated Mar. 13, 2014.
International Search Report and Written Opinion for International Application No. PCT/US2012/052534 dated Feb. 19, 2013.
PCT Invitation to Pay Additional Fees and Communication Relating to the Results of the Partial International Search for International Application No. PCT/US2012/052534 dated Nov. 9, 2012.
Materials from website/Internet: "Presseinformationen FiberForm—Umformen and Hinterspritzen von Organoblechen" http://www.kraussmaffei.com/de/presseinformationen/d/FiberForm.html (Date accessed Oct. 21, 2016).
Materials from website/Internet: "Institut für Verbundwerkstoffe GmbH Kaiserslautern" http://www.ivw.uni-kl.de/forschung-entwicklung/projekte/abgeschlossene-projekte-auswahl/spriform/?_sm_au_=iVVMTSsQV1J2D23N (Date accessed Oct. 21, 2016).
Materials from website/Internet: Leichtbauteile spritzgieben http://www.arburg.com/fileadmin/redaktion/mediathek/prospekte/arburg_leichtbau_681228_de/# (Date accessed Oct. 21, 2016).
Materials from website/Internet: http://news.directindustry.de/press/frimo-group-gmbh/clever-kombiniert-verformenhinterspritzen-einem-schritt-36161-404953.html (access unavailable Jan. 11, 2016).
Office action dated Mar. 28, 2016 from the State Intellectual Property Office (SIPO/China) for CN Application No. 201380055431.1.
Office action dated Sep. 27, 2016 from the Japanese Patent Office (JPO/Japan) for JP Application No. 2015-529917.
Communication pursuant to Article 94(3) EPC from the European Patent Office for EP 13 759 635.9 dated Feb. 21, 2017 (in English) (4 pages).
Response to Communication pursuant to Article 94(3) EPC from the European Patent Office for EP 13 759 635.9 filed Jun. 5, 2017 (in English) (9 pages).
Communication pursuant to Article 94(3) EPC from the European Patent Office for EP 13 759 635.9 dated Jul. 27, 2017 (in English) (4 pages).
Response to Communication pursuant to Article 94(3) EPC from the European Patent Office for EP 13 759 635.9 filed Jan. 14, 2018 (in English) (8 pages).
Chinese Office Action dated Apr. 14, 2015.
Office Action from the Canadian Intellectual Property Office dated Mar. 26, 2015.
Japanese Office Action dated Mar. 24, 2015.
Materials from website/Internet: "Presseinformationen FiberForm—Umformen und Hinterspritzen von Organoblechen" http://www.kraussmaffei.com/de/presseinformationen/d/FiberForm.html (Date accessed Oct. 21, 2016).
Materials from website/Internet: http://news.directindustry.de/press/frimo-group-gmbh/clever-kombiniert-verformen-hinterspritzen-einem-schritt-36161-404953.html (access unavailable Oct. 21, 2016).

\* cited by examiner

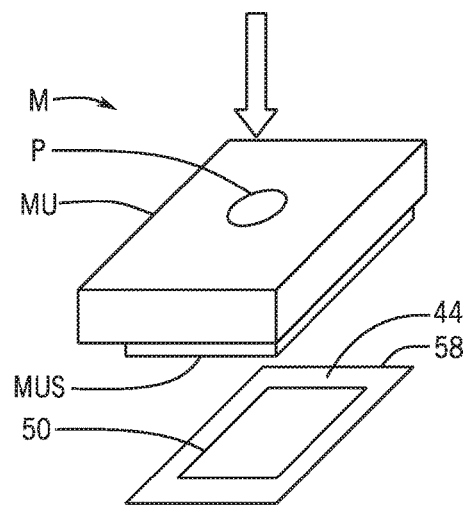
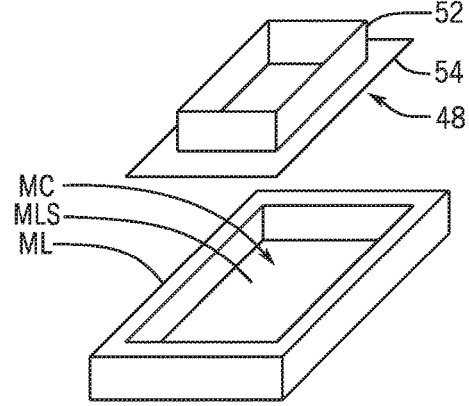
FIG. 3
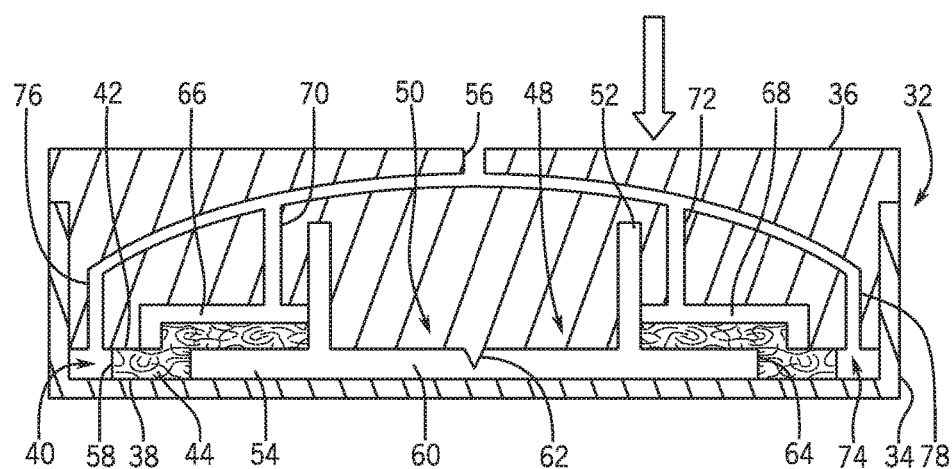
FIG. 4

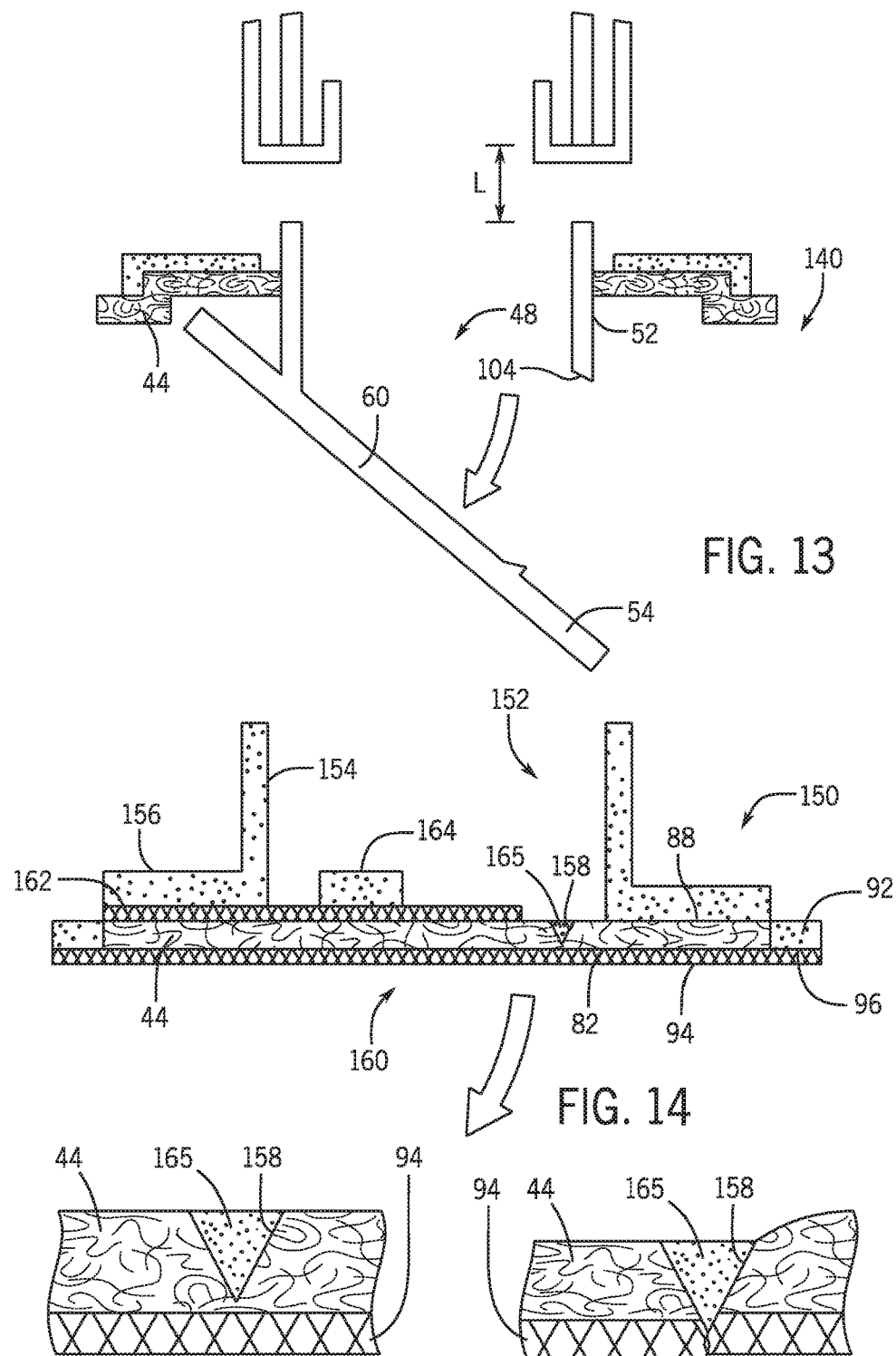

TRIM COMPONENT FOR VEHICLE INTERIOR

CROSS REFERENCE TO RELATED APPLICATIONS

The present application is a continuation of U.S. application Ser. No. 14/424,671 titled "SYSTEM AND METHOD FOR MOUNTING AN AIRBAG CHUTE ASSEMBLY WITHIN A VEHICLE TRIM COMPONENT" filed Feb. 27, 2015.

The present application claims priority from and the benefit of and incorporates by reference in entirety of the following applications: (a) U.S. application Ser. No. 14/424,671 titled "SYSTEM AND METHOD FOR MOUNTING AN AIRBAG CHUTE ASSEMBLY WITHIN A VEHICLE TRIM COMPONENT" filed Feb. 27, 2015; (b) International Application No. PCT/US13/56751 titled "SYSTEM AND METHOD FOR MOUNTING AN AIRBAG CHUTE ASSEMBLY WITHIN A VEHICLE TRIM COMPONENT" filed Aug. 27, 2013; (c) U.S. Provisional Application No. 61/693,634 titled "SYSTEM AND METHOD FOR MOUNTING AN AIRBAG CHUTE ASSEMBLY WITHIN A VEHICLE TRIM COMPONENT" filed Aug. 27, 2012.

FIELD

The present invention relates to a trim component for a vehicle interior. The present invention also relates to a vehicle trim component such as an instrument panel configured for an airbag assembly. The present invention also relates to a system and method for providing for mounting of an airbag assembly providing an airbag on a trim component so that an airbag can be deployed from the assembly through an opening into the vehicle interior.

BACKGROUND

It is known to install an airbag positioned in an interior of a vehicle with intent to provide improved protection for properly seated and restrained vehicle occupants in a crash or impact event (e.g. to substantially reduce the possibility of passenger contact with an interior surface during a high g-force even, e.g. rapid acceleration/deceleration associated with a vehicle impact). For example, an airbag may be installed (e.g. positioned) behind a portion of the instrument panel adjacent to a front passenger; an airbag or set of airbags can be installed (e.g. positioned) in other places in the vehicle interior (according to known arrangements). During a crash or impact event (e.g. high g-force event) the airbag deploys (e.g. through a chute and/or door or passage, etc.) reducing the possibility of contact between the front passenger and the instrument panel.

A typical trim component such as an instrument panel may include an airbag chute assembly positioned behind a visible surface (e.g. show surface) and configured to house an airbag module. In certain instrument panel configurations the airbag chute assembly is vibration welded or otherwise coupled to the surrounding instrument panel support structure. It may be that in manufacture of an instrument panel the process of coupling (e.g. via vibration welding) the airbag chute assembly to the instrument panel support structure is time consuming and labor intensive (e.g. tending to increase the cost and duration of the manufacturing process).

Certain instrument panels include an integral airbag door configured to facilitate deployment of the airbag through the instrument panel. Such airbag doors generally may include a ridge or weakened seam that enables portions of the door to separate from one another during airbag deployment. The ridge is typically formed by machining a groove into a rear surface of the instrument panel. The process of machining the groove may be time consuming and labor intensive (e.g. tending to increase the cost and duration of the manufacturing process).

It would be advantageous to provide for an improved vehicle interior component (e.g. such as a trim component, instrument panel, etc.) that provides for an interface with an airbag (e.g. to deploy through the component in the event of a crash or impact event) comprising an improved arrangement for assembly/manufacture of the compartment (e.g. cost-efficiency, etc.) and/or for deployment of the airbag through the compartment (e.g. in operation/use in an event).

SUMMARY

The present invention relates to a trim component for a vehicle interior configured to support an airbag module providing an airbag configured to be deployed through an opening into the vehicle interior. The trim component may comprise a panel comprising a first material and providing a front side and a back side; and a structure formed from a second material molded on the back side of the panel. The panel may comprise a compression-formed component. The compression-formed component may be configured to provide the opening through a door established upon deployment of the airbag to facilitate deployment of the airbag. The structure may be configured to support the airbag module and to direct the airbag toward the door during deployment of the airbag. The compression-formed component may comprise a feature formed within the panel configured to establish the opening at the door to be created by the airbag at the feature upon deployment of the airbag from the airbag module so that the airbag will deploy through the compression-formed component at the opening. The feature may comprise a recess formed within the panel configured to facilitate deployment of the airbag; the recess may be formed in the back side of the panel. The feature may comprise a resin feature injection molded within the recess configured to facilitate deployment of the airbag. The door may extend between the structure and the feature formed within the panel. Contact between the airbag and the door may cause the door to establish the opening in the compression-formed component along the feature formed within the panel. The trim component may comprise a support coupled to the compression-formed component and the structure; the support may be configured to secure the door to the compression-formed component during deployment of the airbag. The support may be comprised of at least one of (a) fabric, (b) woven fibers, (c) non-woven fibers, (d) glass fibers, (e) carbon fibers, (f) metal fibers, (g) ceramic fibers, (h) polymeric fibers. The support may comprise a resin feature configured to secure the support to the door. The structure may be configured to secure the airbag module to the vehicle trim component; the structure may be configured to reinforce the compression-formed component. The structure may be configured to enhance the structural rigidity of the compression-formed component; the structure may comprise at least one rib. The panel may be formed at least partially from fibers. The trim component may comprise a cover to provide a surface on the compression-formed component; contact between the airbag and the door induces tearing of the cover to establish the opening for the airbag and to facilitate deployment of the airbag though the opening.

The present invention relates to a trim component for a vehicle interior configured to support an airbag module providing an airbag for deployment through an opening into the vehicle interior prepared using a mold by a process. The process may comprise the steps of disposing a fiber panel onto a first surface of the mold, compressing the fiber panel between the first surface and a second surface of the mold to form the fiber panel into a compression-formed component having a shape and forming a structure on a side of the compression-formed component. The shape may correspond to a first contour of the first surface and a second contour of the second surface; the structure may be configured to support the airbag module and to direct the airbag toward the compression-formed component to establish the opening during deployment of the airbag. Forming the structure on a side of the compression-formed component may comprise injecting resin into the mold. Compressing the fiber panel between the first surface and a second surface of the mold may comprise forming a recess within a surface of the fiber panel; the recess may be configured to facilitate deployment of the airbag. The process may comprise providing a fabric support on a side of the fiber panel; the fabric support may be configured to reinforce the compression-formed component.

The present invention relates to a method of manufacturing a vehicle trim component configured to support an airbag module providing an airbag for deployment from the airbag module through an opening into the vehicle interior. The method may comprise the steps of providing a fiber panel on a first surface of a mold, compressing the fiber panel between the first surface and a second surface of the mold to form the fiber panel into a compression-formed component having a shape and injecting resin into the mold to form a structure on a side of the compression-formed component. The shape may correspond to a first contour of the first surface and a second contour of the second surface. The structure may be configured to support the airbag module and to direct the airbag toward the compression-formed component to establish the opening during deployment of the airbag.

The present invention relates to a method of manufacturing a vehicle trim component including disposing a fiber panel within a mold cavity and aligning an airbag chute assembly with the fiber panel. The method also includes compressing the fiber panel within the mold cavity to form the fiber panel into a desired shape. At least a portion of the fiber panel is compressed between a surface of the mold cavity and a surface of the airbag chute assembly.

The present invention relates to a vehicle trim component prepared by a process including disposing a fiber panel within a mold cavity and aligning an airbag chute assembly with the fiber panel. The method also includes compressing the fiber panel within the mold cavity to form the fiber panel into a desired shape. At least a portion of the fiber panel is compressed between a surface of the mold cavity and a surface of the airbag chute assembly.

The present invention relates to a vehicle trim component including an airbag chute assembly and a fiber panel in contact with the airbag chute assembly. At least a portion of the fiber panel is compression-formed against the airbag chute assembly to establish a substantially smooth outer surface of the vehicle trim component.

The present invention relates to a method of manufacturing a vehicle trim component including disposing an airbag chute assembly within a mold cavity and injecting resin into the mold cavity to form a support structure around the airbag chute assembly. The mold cavity is configured to form the support structure in substantial alignment with the airbag chute assembly to establish a substantially smooth outer surface of the vehicle trim component.

The present invention relates to a vehicle trim component including a substrate having an opening. The vehicle trim component also includes an airbag chute assembly having a door, a chute coupled to the door and extending through the opening and a flange extending outwardly from the chute and overlapping a portion of the substrate. The flange is secured to an outer surface of the substrate and the flange is configured to separate from the outer surface upon contact between an airbag and the door to facilitate movement of the airbag chute assembly relative to the substrate.

The present invention relates to a vehicle trim component including a fiber panel having a recess formed within a rear surface of the fiber panel. The vehicle trim component also includes a resin mounting structure injection molded onto the rear surface of the fiber panel. The resin mounting structure is configured to support an airbag module and the recess is configured to facilitate deployment of an airbag from the airbag module.

The present invention relates to a method of manufacturing a vehicle trim component including disposing a fiber panel within a mold cavity. The method also includes compressing the fiber panel within the mold cavity to form the fiber panel into a desired shape and to form a recess within a rear surface of the fiber panel. The method includes injecting resin into the mold cavity to form a mounting structure on the rear surface of the fiber panel. The mounting structure is configured to support an airbag module and the recess is configured to facilitate deployment of an airbag from the airbag module.

FIGURES

FIG. 3 is a schematic perspective view of a mold assembly that may be configured to produce a trim component according to an exemplary embodiment.

FIG. 4 is a schematic cross-sectional view of a mold assembly in a closed position according to an exemplary embodiment.

FIG. 13 is a schematic cross-sectional view of a vehicle trim component according to an exemplary embodiment.

FIG. 14 is a schematic cross-sectional view of a vehicle trim component with a mounting structure for an airbag module according to an exemplary embodiment.

FIG. 14A is a schematic detail cross-sectional view of a vehicle trim component with a mounting structure for an airbag module according to an exemplary embodiment.

FIG. 14B is a schematic detail cross-sectional view of a vehicle trim component with a mounting structure for an airbag module according to an exemplary embodiment.

DESCRIPTION

Figure 1:
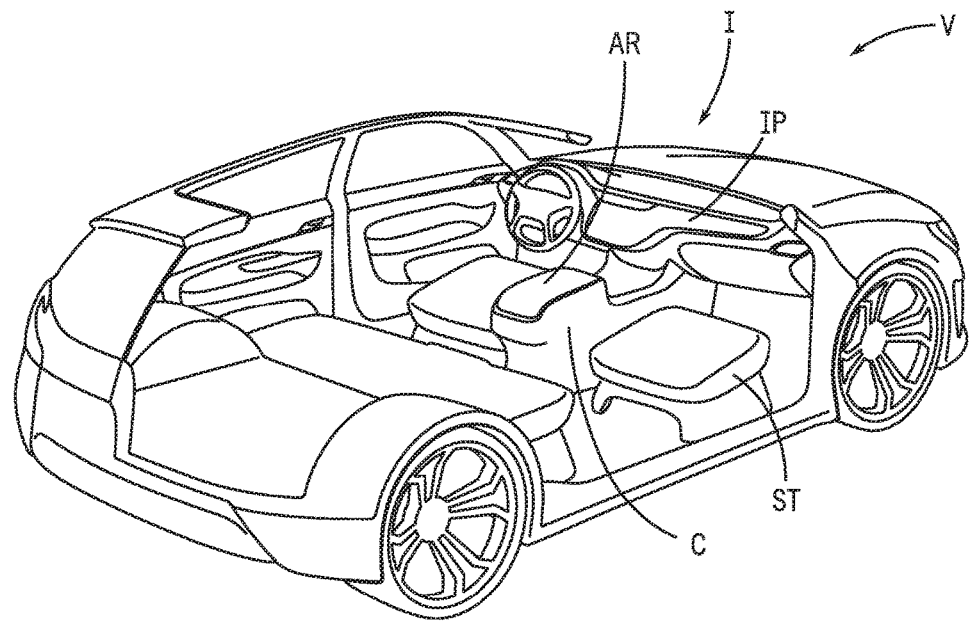
FIG. 1 is a schematic perspective view of a vehicle that may comprise a trim component providing an airbag chute assembly according to an exemplary embodiment.
Figure 2:
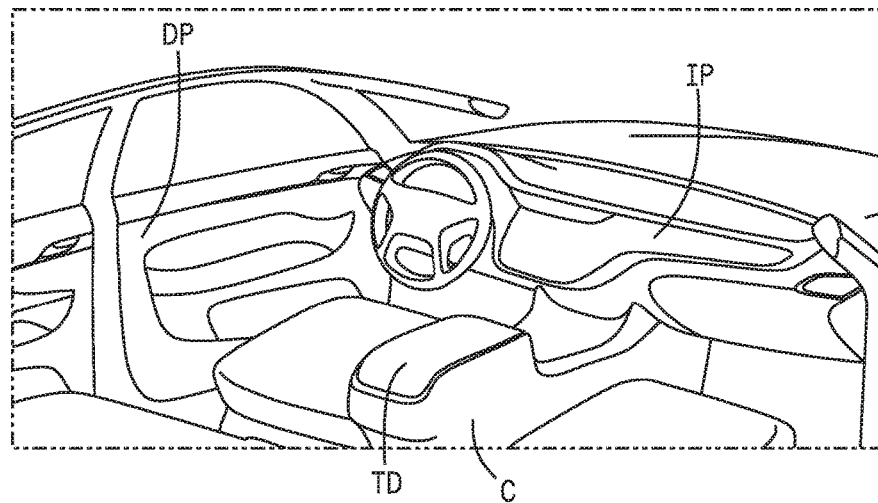
FIG. 2 is a schematic perspective view of an interior of a vehicle according to an exemplary embodiment.

The vehicle trim component may be provided for a vehicle V with vehicle interior I as shown in FIGS. 1 and 2. A trim component for a vehicle interior may be produced and/or provided as shown according to an exemplary embodiment in FIGS. 1, 2, 3, 4, 5-7, 8, 9, 10, 11-14 and 14A-14B. According to an exemplary embodiment, the vehicle trim component may comprise an instrument panel configured for an airbag assembly. See e.g. FIGS. 1, 2, 5-7, 9 and 11-14. According to an exemplary embodiment, a system and method may be provided for mounting of an airbag assembly providing an airbag on a trim component so that an airbag can be deployed from the assembly through an opening into the vehicle trim interior. See e.g. FIGS. 1-2, 3, 4, 8 and 10.

According to an exemplary embodiment, a vehicle interior may be configured to support an airbag module providing an airbag configured to be deployed through an opening into the vehicle interior. The trim component may comprise a panel comprising a first material and providing a front side and a back side; and a structure formed from a second material molded on the back side of the panel. The panel may comprise a compression-formed component. The compression-formed component may be configured to provide the opening through a door established upon deployment of the airbag to facilitate deployment of the airbag. The structure may be configured to support the airbag module and to direct the airbag toward the door during deployment of the airbag. The compression-formed component may comprise a feature formed within the panel configured to establish the opening at the door to be created by the airbag at the feature upon deployment of the airbag from the airbag module so that the airbag will deploy through the compression-formed component at the opening. See generally FIGS. 2, 3, 6, 10, 14, 14A-14B.

According to an exemplary embodiment, a trim component for a vehicle interior may be configured to support an airbag module providing an airbag for deployment through an opening into the vehicle interior prepared using a mold by a process. The process may comprise the steps of disposing a fiber panel onto a first surface of the mold and compressing the fiber panel between the first surface and a second surface of the mold to form the fiber panel into a compression-formed component having a shape. The process may comprise forming a structure on a side of the compression-formed component. The shape may correspond to a first contour of the first surface and a second contour of the second surface; the structure may be configured to support the airbag module and to direct the airbag toward the compression-formed component to establish the opening during deployment of the airbag. See generally FIGS. 2, 3, 6, 8, 10, 14, 14A-14B.

According to an exemplary embodiment, a method of manufacturing a vehicle trim component configured to support an airbag module providing an airbag for deployment from the airbag module through an opening into the vehicle interior is provided. See e.g. FIGS. 3 and 9-14. The method may comprise the steps of providing a fiber panel on a first surface of a mold, compressing the fiber panel between the first surface and a second surface of the mold to form the fiber panel into a compression-formed component having a shape and injecting resin into the mold to form a structure on a side of the compression-formed component. The shape may correspond to a first contour of the first surface and a second contour of the second surface. The structure may be configured to support the airbag module and to direct the airbag toward the compression-formed component to establish the opening during deployment of the airbag. See generally FIGS. 2, 3, 6, 8, 10, 14, 14A-14B.

EXEMPLARY EMBODIMENTS

FIG. 1 is a schematic perspective view of an exemplary vehicle V that may include a trim component having an airbag chute assembly. As shown schematically according to an exemplary embodiment, the vehicle V includes an interior I having a seat ST, an armrest AR, a center console C and an instrument panel IP. Certain trim components of the seat ST, the armrest AR, the center console C, the instrument panel IP and/or other areas within the interior I (e.g. A-pillar, B-pillar, rear seat, etc.) may include a fiber panel compression-formed against an airbag chute assembly.

According to an exemplary embodiment, a vehicle trim component is prepared by a process including disposing a fiber panel within a mold cavity and aligning an airbag chute assembly with the fiber panel. The fiber panel is then compressed within the mold cavity to form the fiber panel into a desired shape. At least a portion of the fiber panel is compressed between a surface of the mold cavity and a surface of the airbag chute assembly. According to an exemplary embodiment, the fiber panel is compression-formed against the airbag chute assembly; the airbag chute assembly and the fiber panel may remain secured to one another throughout the remainder of the trim component manufacturing process. According to an exemplary embodiment, the process of separately coupling the airbag chute assembly to the surrounding structure of the trim component (e.g. via vibration welding) may be obviated (e.g. eliminated) in an effort to reduce the duration and costs associated with manufacturing a vehicle trim component.

According to an exemplary embodiment, the airbag chute assembly may include a door (e.g. formed integrally with the chute) configured to facilitate deployment of an airbag. For example, a recess may be formed within a rear surface of the door to enable portions of the door to separate from one another during airbag deployment; the airbag chute assembly may include a door coupled to the chute by at least one weakened connection; the weakened connection is configured to facilitate separation of a portion of the door from the chute during airbag deployment. According to an exemplary embodiment, the airbag chute assembly includes a door; the process of forming a door within an element of the vehicle interior (e.g. machining a groove within a rear surface of the instrument panel) may be eliminated (e.g. duration and costs associated with manufacturing the vehicle trim component may be reduced).

FIG. 2 is a schematic perspective view of a part of the interior of the vehicle of FIG. 1. According to an exemplary embodiment, the vehicle interior I includes an instrument panel IP having a fiber panel and an airbag chute assembly. Compression forming the fiber panel against the airbag chute assembly forms a trim component having a substantially smooth outer surface. A cover stock (e.g. a compression laminated skin, an in mold grain laminated skin, a grained thermoplastic polyolefin skin with foam backing, etc.) is provided on the outer surface of the trim component; the show surface of the instrument panel IP may appear substantially smooth. According to an exemplary embodiment, the smooth show surface may enhance the appearance of the vehicle interior as compared to instrument panels having visible seams (e.g. at the interface between the airbag door and the surrounding structure of the instrument panel). According to an exemplary embodiment, the compression forming process is described with reference to an instrument panel IP; the compression forming process may be utilized for other interior components of a vehicle (such as vehicle V). According to an exemplary embodiment, the interior I includes a floor console C having a tambour door TD; the floor console C may include a fiber panel compression-formed against an airbag chute assembly. The interior I includes a door panel I that may also include a fiber panel compression-formed against an airbag chute assembly.

FIG. 3 is a schematic perspective view of an embodiment of a mold assembly M configured to produce a trim component by compression forming a fiber panel against an airbag chute assembly. According to an exemplary embodiment, the mold assembly M includes a first (e.g. lower) mold element ML and a second (e.g. upper) mold element MU; the first mold element ML includes a first surface MLS defining a first portion of a mold cavity MC and the second mold element MU includes a second surface MUS defining a second portion of the mold cavity MC. The first surface MLS is configured to receive a fiber panel 44 and the second surface MUS is configured to compress the fiber panel 44 against the first surface MLS to form the fiber panel 44 into a desired shape.

According to an exemplary embodiment, the fiber panel 44 includes a combination of structural fibers and thermoplastic resin; the structural fibers may include natural fibers (e.g. hemp, wood, flax, kenaf and sisal) and/or synthetic fibers (e.g. glass fibers, carbon fibers and polymeric fibers); the thermoplastic resin may include polypropylene (PP), acrylonitrile butadiene styrene (ABS) and/or polycarbonate (PC) binders. According to an exemplary embodiment, the fiber panel 44 may be constructed from about 50 percent natural fibers and about 50 percent polypropylene (PP). (According to an exemplary embodiment, the fiber panel 44 may be constructed from a material that has been called EcoCor.) To facilitate compression forming the fiber panel 44 is heated (e.g. to about 200 degrees Celsius) to induce the thermoplastic resin to soften; the fiber panel 44 is then provided on the first surface MLS of the cavity MC and compressed between the first surface MLS and the second surface MUS as the second mold element MU is driven toward the first mold element ML along the direction. As the fiber panel 44 cools within the mold assembly M the thermoplastic solidifies establishing a substantially rigid composite panel that conforms to the shape of the mold cavity MC.

According to an exemplary embodiment, at least a portion of the fiber panel 44 is compressed between a surface of the mold cavity MC and an airbag chute assembly 48. Compression forming the fiber panel 44 against the airbag chute assembly 48 secures the airbag chute assembly to the fiber panel throughout the remainder of the trim component manufacturing process; the process of separately coupling the airbag chute assembly to the surrounding structure of the trim component (e.g. via vibration welding) is obviated (e.g. eliminated). The fiber panel 44 includes an opening 50 configured to receive a chute 52 of the airbag chute assembly 48. Prior to compression forming the fiber panel 44, the airbag chute assembly 48 may be aligned with the fiber panel 44 (e.g. the chute 52 may be aligned with the opening 50). As the fiber panel 44 is compressed within the mold cavity MC a portion of the fiber panel 44 is compressed against a flange 54 of the airbag chute assembly 48. A substantially smooth outer surface of the trim component (e.g. including an outer surface of the fiber panel and an outer surface of the flange) may be formed.

According to an exemplary embodiment, after the fiber panel 44 is compression-formed against the airbag chute assembly 48, resin is injected into the mold cavity (e.g. via the port P) to fill a void between the first surface MLS and the second surface MUS adjacent to the fiber panel 44. According to an exemplary embodiment, the void extends about a periphery 58 of the fiber panel 44. According to an exemplary embodiment, the injected resin fills the void and establishes a border about the fiber panel 44 as the resin hardens and/or cures (e.g. subject to the dimensional accuracy of the mold cavity, each edge of the resultant trim component substantially corresponds to the desired dimensions). The process of trimming the edges of the component after formation may be obviated (e.g. eliminated) decreasing the duration of the manufacturing process (and reducing the quantity of offal that may otherwise result e.g. requiring disposal such as deposited in a landfill, etc.).

According to an exemplary embodiment, resin may be injected into the mold cavity (e.g. via the port P) to form support members on the rear surface of the fiber panel 44; the support members may include ribs configured to enhance the structural rigidity of the fiber panel; the ribs may extend outwardly from the airbag chute assembly and/or around the airbag chute assembly.

FIG. 4 is a schematic cross-sectional view of an embodiment of a mold assembly M in a closed position. According to an exemplary embodiment, the airbag chute assembly 48 includes a door 60 and a recess 62 formed within a rear surface of the door 60 to facilitate airbag deployment; the door 60 and the flange 54 are provided against the first surface MLS of the mold cavity MC. According to an exemplary embodiment, the fiber panel 44 is provided around the airbag chute assembly 48 such that the chute 52 extends through the opening 50 and the flange 54 overlaps a portion of the fiber panel 44; a first portion of the fiber panel 44 is in contact with the first surface MLS of the mold cavity MC and a second portion of the fiber panel 44 is in contact with the flange 54 of the airbag chute assembly 48. When the second mold element MU is driven in the direction, the first portion of the fiber panel 44 is compressed between the first surface MLS and the second surface MUS of the mold cavity MC. The second portion of the fiber panel 44 is compressed between the second surface MUS of the mold cavity MC and the flange 54 of the airbag chute assembly 48. According to an exemplary embodiment, a portion of the fiber panel 44 is compression-formed against the airbag chute assembly 48; the airbag chute assembly 48 and the fiber panel 44 may remain secured to one another throughout the remainder of the trim component manufacturing process. The process of separately coupling the airbag chute assembly to the surrounding structure of the trim component (e.g. via vibration welding) may be obviated (e.g. eliminated) reducing the duration and costs associated with manufacturing a vehicle trim component.

Compression forming the fiber panel 44 against the airbag chute assembly 48 forms a trim component having a substantially smooth outer surface. According to an exemplary embodiment, an outer edge 64 of the flange 54 is substantially perpendicular to the fiber panel 44; the fiber panel 44 is compression-formed against the flange; the resulting trim component includes a substantially smooth transition between the flange 54 and the fiber panel 44. (According to an exemplary embodiment, a gap between the flange 54 and the fiber panel 44 along the outer surface may be less than about 1.5 mm, less than about 1.25 mm, less than about 1.0 mm, etc, as specified.) The recess 62 (which is configured to facilitate deployment of the airbag) is formed within a rear surface of the door 60 establishing a substantially smooth outer surface of the airbag chute assembly 48. A cover stock (e.g. a compression laminated skin, an in mold grain laminated skin, a grained thermoplastic polyolefin skin with foam backing, etc.) is provided on the outer surface of the trim component; the show surface of the instrument panel may appear substantially smooth enhancing the appearance of the vehicle interior.

According to an exemplary embodiment, the mold cavity MC includes a first void 66 positioned between the fiber panel 44 and the second surface MUS of the mold cavity MC. The mold cavity MC includes a second void 68 positioned between the fiber panel 44 and the second surface MUS of the mold cavity MC. The first and second voids 66 and 68 are configured to form ancillary components of the vehicle trim component such as support ribs or connectors. A first fluid pathway 70 extends between the port P and the first void 66 and a second fluid pathway 72 extends between the port P and the second void 68. According to an exemplary embodiment, liquid resin is injected into the port P; the resin flows into the voids 66 and 68 establishing the ancillary components on the rear surface of the fiber panel 44 as the resin cures and/or hardens.

According to an exemplary embodiment, the mold cavity MC includes a third void 74 extending about the periphery 58 of the fiber panel 44. Resin may be injected into the void 74 to establish a border about the fiber panel 44 as the resin hardens and/or cures. According to an exemplary embodiment, the mold assembly M includes a third fluid pathway 76 extending between the port P and a first portion of the void 74 and a fourth fluid pathway 78 extending between the port P and a second portion of the void 74. When liquid resin is injected into the port P the resin flows into the void 74 establishing a border surrounding the fiber panel 44. According to an exemplary embodiment, the mold cavity includes voids configured to form support ribs and a resin border; certain mold cavities may include voids configured to form connectors on the rear surface of the fiber panel. Such connectors may enable the vehicle trim component to be coupled to the surrounding vehicle structure.

In operation, a fiber panel 44 is provided in the mold cavity MC (e.g. held within a desired position/orientation via multiple holding pins). An airbag chute assembly 48 is then aligned with the fiber panel 44; the chute 52 may be aligned with the opening 50 in the fiber panel 44. The fiber panel 44 is then compressed within the mold cavity MC to form the fiber panel into a desired shape. At least a portion of the fiber panel is compressed between a surface of the mold cavity and a surface of the airbag chute assembly (e.g. the flange 54). As the fiber panel 44 solidifies within the mold cavity MC, resin is injected into the port P filling the voids 66, 68 and 74; as the resin cures and hardens the resin binds to the fiber panel 44 forming a trim component having the desired shape, structural properties and/or ancillary components. According to an exemplary embodiment, the resin may include a thermoplastic material (e.g. polypropylene (PP), acrylonitrile butadiene styrene (ABS) or polycarbonate (PC)) or a thermoset material (e.g. epoxy resin, polyimide resin, polyester resin or vinylester resin). According to an exemplary embodiment, the resin is injected into the mold in a liquid state and solidifies as the resin cures/hardens. Resin parts are formed having shapes corresponding to the shapes of the respective voids within the mold cavity MC. According to an exemplary embodiment, the injected resin may be molded with a cellular structure (e.g. via a chemical or mechanical blowing agent) to reduce a mass of the trim component and/or to enhance processing properties.

Figure 5:
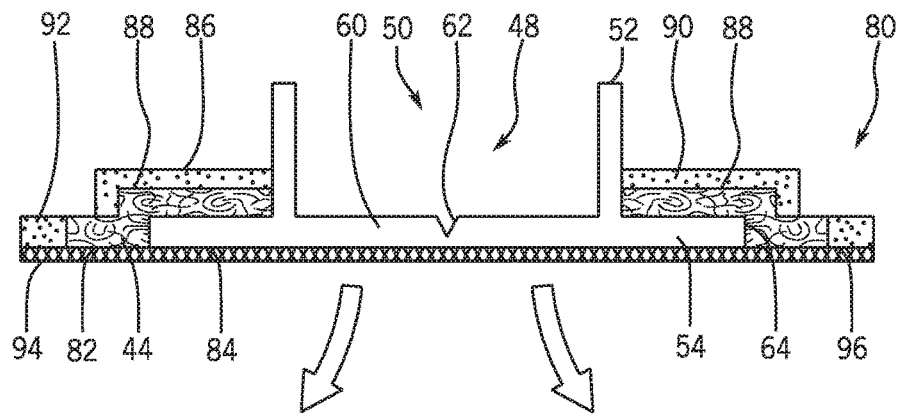
FIG. 5 is a schematic cross-sectional view of a vehicle trim component according to an exemplary embodiment.

FIG. 5 is a schematic cross-sectional view of an embodiment of a vehicle trim component 80 manufactured by compression forming a fiber panel against an airbag chute assembly. The trim component 80 includes an airbag chute assembly 48 and a fiber panel 44 in contact with the airbag chute assembly. A portion of the fiber panel 44 is compression-formed against the flange 54 of the airbag chute assembly 48 establishing a substantially smooth outer surface of the vehicle trim component. An outer surface 82 of the fiber panel 44 is substantially aligned with an outer surface 84 of the airbag chute assembly; the outer edge 64 of the flange 54 is substantially perpendicular to the fiber panel 44 establishing a substantially smooth transition between the flange 54 and the fiber panel 44. The aligned surfaces and the smooth transition between surfaces establish a smooth outer surface of the trim component 80.

According to an exemplary embodiment, the outer edge 64 of the flange 54 is substantially perpendicular to the fiber panel 44; the outer edge of the flange may be oriented at other angles. According to an exemplary embodiment, the outer edge 64 may be angled toward the fiber panel 44 or angled away from the fiber panel; the outer edge 64 may include multiple facets and/or may include a curved portion. An inner edge of the fiber panel may abut the outer edge of the flange, substantially reducing or eliminating the overlap between the fiber panel and the airbag chute assembly.

According to an exemplary embodiment, the vehicle trim component 80 includes a first resin support member 86 injection molded onto a rear surface 88 of the fiber panel 44 and configured to support the fiber panel. The first resin support member 86 may be formed by injecting resin into the first void 66. The vehicle trim component 80 includes a second resin support member 90 injection molded onto the rear surface 88 of the fiber panel 44 and configured to support the fiber panel. The second resin support member 90 may be formed by injecting resin into the second void 68. The resin support members 86 and 90 extend to the chute 52; the resin support members may couple the airbag chute assembly 48 to the fiber panel 44. According to an exemplary embodiment, the vehicle trim component 80 includes two resin support members 86 and 90; additional resin support members may be provided extending outwardly from the airbag chute assembly 48 according to an exemplary embodiment. According to an exemplary embodiment, the trim component may include resin support members extending around the airbag chute assembly and/or otherwise oriented on the rear surface 88 of the fiber panel 44.

The vehicle trim component 80 includes a resin border 92 extending about a periphery 58 of the fiber panel 44; the resin border 92 may be formed by injecting resin into the third void 74 of the mold cavity MC. (Due to the dimensional accuracy of the third void 74 of the mold cavity MC, each edge of the resultant trim component substantially corresponds to desired dimensions.) The process of trimming the edges of the component after formation may be obviated (e.g. eliminated) decreasing the duration of the manufacturing process and reducing the quantity of offal that may otherwise be deposited in a landfill.

According to an exemplary embodiment, a cover stock 94 is provided on an outer surface of the vehicle trim component to form a show surface. An outer surface 96 of the resin border 92, the outer surface 82 of the fiber panel 44 and the outer surface 84 of the airbag chute assembly 48 are substantially aligned with one another. According to an exemplary embodiment, the cover stock 94 is provided on the outer surfaces; the show surface of the instrument panel may appear substantially smooth enhancing the appearance of the vehicle interior.

According to an exemplary embodiment, the door 60 includes a recess 62 formed within a rear surface of the door; the recess 62 enables portions (e.g. panels) of the door to separate from one another during airbag deployment. According to an exemplary embodiment, the airbag deploys; contact between the airbag and the door 60 induces the panels to separate from one another along the recess 62. As the airbag drives the panels, the panels tear an opening in the cover stock 94, facilitating airbag deployment. According to an exemplary embodiment, the airbag chute assembly includes a door; the process of forming a door within an element of the vehicle interior (e.g. machining a groove within a rear surface of the instrument panel) is obviated (e.g. eliminated). The duration and costs associated with manufacturing the vehicle trim component may be further reduced; according to an exemplary embodiment, the recess 62 is formed on the rear surface of the door 60; the outer surface of the door 60 may be substantially smooth, maintaining the smooth appearance of the vehicle trim component 80.

Figure 6:
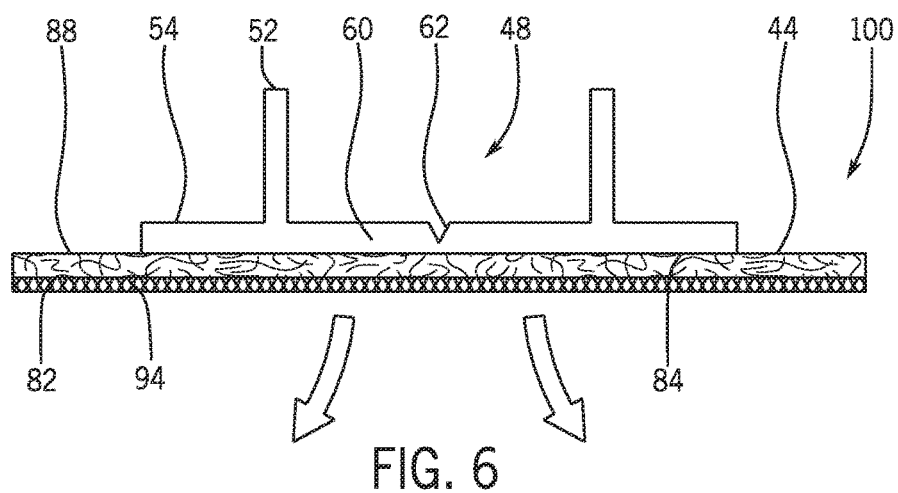
FIG. 6 is a schematic cross-sectional view of a vehicle trim component according to an exemplary embodiment.

FIG. 6 is a schematic cross-sectional view of a vehicle trim component 100 manufactured by compression forming a fiber panel against an airbag chute assembly. According to an exemplary embodiment, the outer surface 84 of the airbag chute assembly 48 is in contact with the rear surface 88 of the fiber panel 44. To form the vehicle trim component 100, the fiber panel 44 is compressed between the first surface MLS of the mold cavity MC and the outer surface 84 of the airbag chute assembly 48. According to an exemplary embodiment, the fiber panel 44 is compression-formed against the airbag chute assembly 48; the airbag chute assembly and the fiber panel may remain secured to one another throughout the remainder of the trim component manufacturing process. The process of separately coupling the airbag chute assembly to the surrounding structure of the trim component (e.g. via vibration welding) may be obviated (e.g. eliminated) reducing the duration and costs associated with manufacturing a vehicle trim component.

The fiber panel 44 does not include an opening for the airbag chute assembly; the outer surface of the trim component 100 may be substantially smooth. According to an exemplary embodiment, the cover stock 94 is applied to the outer surface 82 of the fiber panel 44; the cover stock may form a smooth show surface, aesthetically enhancing the vehicle trim component 100. The airbag door 60 may be configured to tear an opening in the fiber panel 44 and the cover stock 94 to facilitate airbag deployment. When the airbag deploys, contact between the airbag and the door 60 induces the door panels to separate from one another along the recess 62; as the airbag drives the panels in the direction, the panels tear an opening in the fiber panel 44 and the cover stock 94 facilitating airbag deployment. According to an exemplary embodiment, the vehicle trim component 100 may include resin members injection molded onto the rear surface 88 of the fiber panel 44 and configured to support the fiber panel 44; the vehicle trim component 100 may include a resin border extending about a periphery 58 of the fiber panel 44.

Figure 7:
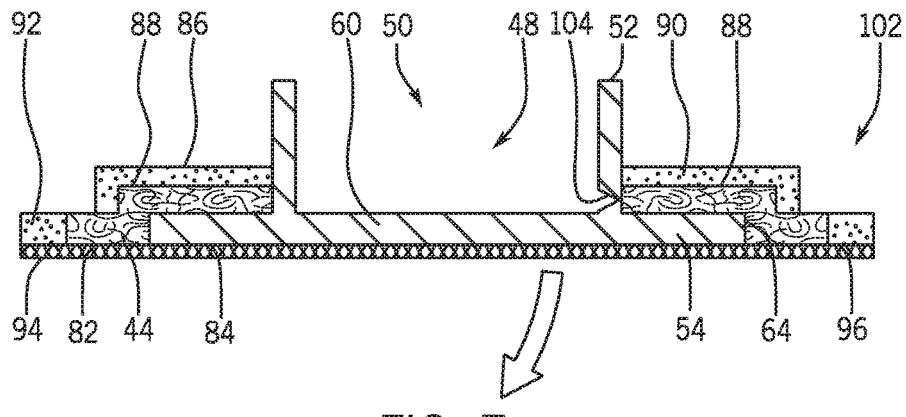
FIG. 7 is a schematic cross-sectional view of a vehicle trim component according to an exemplary embodiment.

FIG. 7 is a schematic cross-sectional view of a further embodiment of a vehicle trim component 102 manufactured by compression forming a fiber panel against an airbag chute assembly. According to an exemplary embodiment, the airbag chute assembly 48 includes the door 60 and the chute 52. The door 60 is coupled to the chute 52 by a weakened connection 104 to facilitate airbag deployment. According to an exemplary embodiment, the airbag deploys; contact between the airbag and the door 60 induces the door 60 to separate from the chute 52 along the weakened connection. As the airbag drives the door in the direction a portion of the flange 54 adjacent to the weakened connection 104 separates from the fiber panel 44; the door 60 then tears an opening in the cover stock 94 facilitating airbag deployment. According to an exemplary embodiment, the airbag chute assembly includes a door; the process of forming a door within an element of the vehicle interior (e.g. by machining a groove within a rear surface of the instrument panel) is obviated (e.g. eliminated). The duration and costs associated with manufacturing the vehicle trim component may be further reduced. The weakened connection 104 is formed at the interface between the door 60 and the chute 52; the outer surface of the door 60 may be substantially smooth maintaining the smooth appearance of the vehicle trim component 80.

According to an exemplary embodiment, the component may provide one weakened connection 104; the component may include additional weakened connections between the door 60 and the chute 52 according to an exemplary embodiment. According to an exemplary embodiment, the chute 52 may provide four sides (e.g. four-sided); three of the sides may include weakened connections. According to an exemplary embodiment, the door may remain attached to the chute by the remaining side after airbag deployment.

Figure 8:
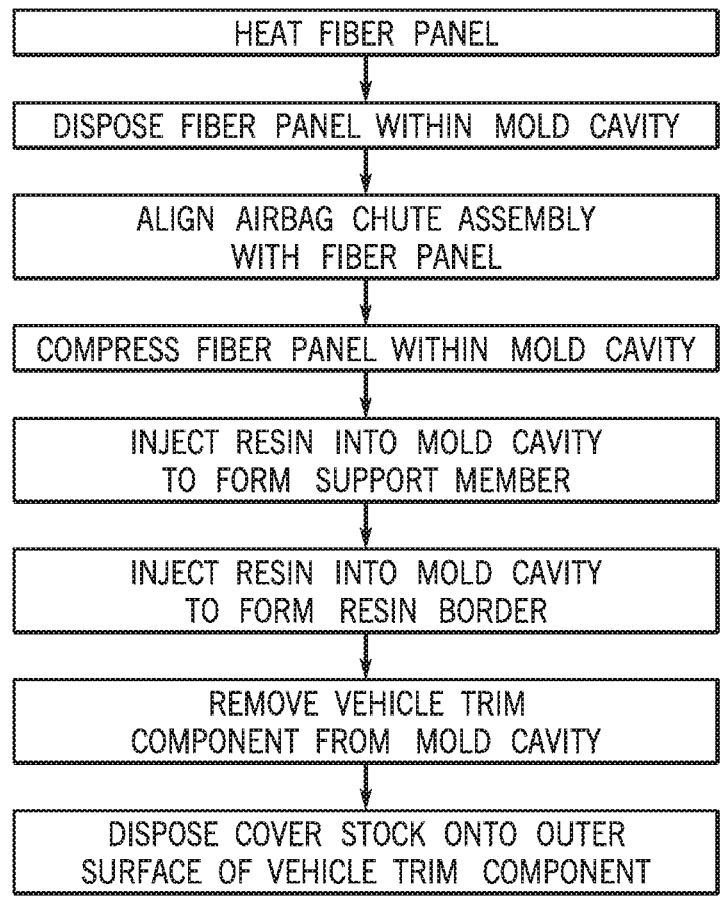
FIG. 8 is a schematic flow diagram of a method of manufacturing a vehicle trim component according to an exemplary embodiment.

FIG. 8 is a schematic flow diagram of an embodiment of a method of manufacturing a vehicle trim component by compression forming a fiber panel against an airbag chute assembly. A fiber panel is heated; if the fiber panel includes thermoplastic resin heating the panel softens the resin facilitating compression forming of the panel. The fiber panel is provided in a mold cavity. An airbag chute assembly is then aligned with the fiber panel; a chute of the airbag chute assembly may be aligned with an opening in the fiber panel; a door of the airbag chute assembly may be aligned with a desired region of the fiber panel. According to an exemplary embodiment, the airbag chute assembly is provided in the mold cavity prior to the fiber panel; the airbag chute assembly may be provided in the mold cavity and the fiber panel may be aligned with the airbag chute assembly. The airbag chute assembly may be aligned with the fiber panel prior to disposing both elements into the mold cavity.

According to an exemplary embodiment, the fiber panel is compressed within the mold cavity; at least a portion of the fiber panel is compressed between a surface of the mold cavity and a surface of the airbag chute assembly. According to an exemplary embodiment, the airbag chute assembly includes a flange extending outwardly from the chute and configured to overlap a portion of the fiber panel. As the fiber panel is compressed within the mold cavity, the portion of the fiber panel is compressed between a surface of the mold cavity and a surface of the flange. The fiber panel may be compressed between a surface of the mold cavity and a surface of a door of the airbag chute assembly. According to an exemplary embodiment, the fiber panel is compression-formed against the airbag chute assembly; the airbag chute assembly and the fiber panel may remain secured during the trim component manufacturing process obviating the process of separately coupling the airbag chute assembly to the surrounding structure of the trim component (e.g. via vibration welding).

According to an exemplary embodiment, resin may be injected into the mold cavity to form support members on a rear surface of the fiber panel. According to an exemplary embodiment, the support members may include ribs configured to enhance the structural rigidity of the fiber panel. The ribs may extend outwardly from the airbag chute assembly and/or around the airbag chute assembly. Resin is injected into the mold cavity to form a resin border extending about at least a portion of a periphery of the fiber panel (e.g. subject to the dimensional accuracy of the mold cavity, each edge of the resultant trim component substantially corresponds to desired dimensions). The process of trimming the edges of the component after formation may be obviated (e.g. eliminated) decreasing the duration of the manufacturing process and reducing the quantity of offal that may otherwise be deposited in a landfill. According to an exemplary embodiment, a cover stock may be provided on an outer surface of the trim component to aesthetically enhance a show surface of the component; the vehicle trim component is removed from the mold cavity; a cover stock is provided on the outer surface of the component to form the show surface.

Figure 9:
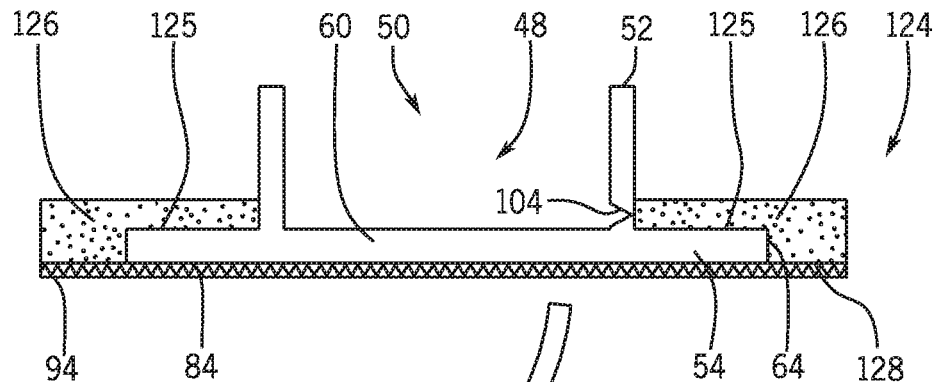
FIG. 9 is a schematic cross-sectional view of a vehicle trim component according to an exemplary embodiment.

FIG. 9 is a schematic cross-sectional view of an embodiment of a vehicle trim component 124 manufactured by injecting resin around an airbag chute assembly to form a support structure. According to an exemplary embodiment, resin is injected onto a rear surface 125 of the flange 54 forming a support structure 126 that extends laterally outward from the chute 52. The support structure 126 may be coupled to elements of the vehicle structure to secure the trim component 124 to a desired region of the vehicle interior. According to an exemplary embodiment, the resin is injected directly onto the airbag chute assembly; a fiber panel which may be employed is obviated (e.g. eliminated).

According to an exemplary embodiment, the outer surface 84 of the airbag chute assembly 48 is substantially aligned with an outer surface 128 of the support structure 126 establishing a substantially smooth transition between the flange 54 and the support structure 126; the aligned surfaces and the smooth transition between surfaces establish a smooth outer surface of the trim component 124. According to an exemplary embodiment, a cover stock 94 is provided on the outer surface of the vehicle trim component to form a show surface. According to an exemplary embodiment, the outer surface of the vehicle trim component is substantially smooth; a substantially smooth show surface may be formed enhancing the appearance of the vehicle interior.

According to an exemplary embodiment, the door 60 is coupled to the chute 52 by a weakened connection 104 to facilitate airbag deployment. According to an exemplary embodiment, the airbag deploys; contact between the airbag and the door 60 induces the door 60 to separate from the chute 52 along the weakened connection. The airbag drives the door in the direction; a portion of the flange 54 adjacent to the weakened connection 104 separates from the support structure 126. The door 60 then tears an opening in the cover stock 94 facilitating airbag deployment. According to an exemplary embodiment, the airbag door 60 may include a recess 62 formed within a rear surface of the door 60 to facilitate airbag deployment.

Figure 10:
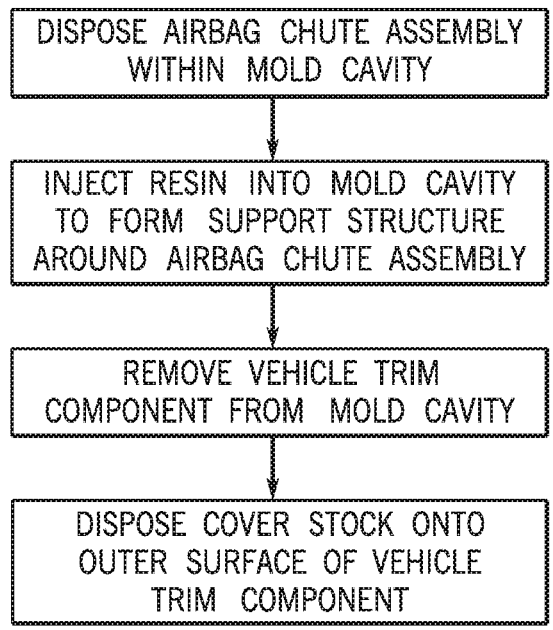
FIG. 10 is a schematic flow diagram of a method of manufacturing a vehicle trim component according to an exemplary embodiment.

FIG. 10 is a schematic flow diagram of an embodiment of a method of manufacturing a vehicle trim component by injecting resin around an airbag chute assembly to form a support structure according to an exemplary embodiment. An airbag chute assembly is provided in a mold cavity; resin is then injected into the mold cavity to form a support structure around the airbag chute assembly. The resin support structure may be formed by injecting resin into a void within the mold cavity. According to an exemplary embodiment, the mold cavity may be configured to form the support structure in substantial alignment with the airbag chute assembly to establish a substantially smooth outer surface of the vehicle trim component. According to an exemplary embodiment, a cover stock may be provided on an outer surface of the trim component to aesthetically enhance a show surface of the component. According to an exemplary embodiment, the vehicle trim component is removed from the mold cavity; a cover stock is provided on the outer surface of the component to form the show surface.

Figure 11:
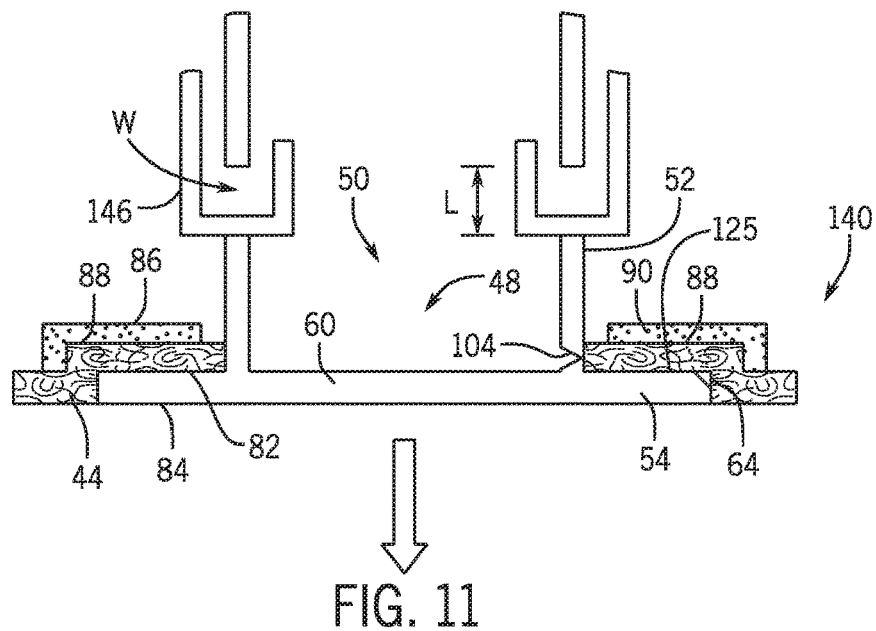
FIG. 11 is a schematic cross-sectional view of a vehicle trim component according to an exemplary embodiment.

FIG. 11 is a schematic cross-sectional view of an embodiment of a vehicle trim component 140 having an airbag chute assembly configured to separate from a substrate upon deployment of an airbag. According to an exemplary embodiment, the vehicle trim component includes a substrate (e.g. the fiber panel 44) having an opening 50. The vehicle trim component 140 includes the airbag chute assembly 48 having a door 60, a chute 52 coupled to the door 60 and extending through the opening 50 and a flange 54 extending outwardly from the chute 52 and overlapping a portion of the fiber panel 44. According to an exemplary embodiment, the fiber panel 44 is compression-formed against the flange 54; the rear surface 125 of the flange 54 is secured to the outer surface 82 of the fiber panel 44. During airbag deployment, the flange 54 is configured to separate from the fiber panel 44 facilitating movement of the airbag chute assembly 48 relative to the fiber panel 44. Upon contact between the airbag and the door 60, the rear surface 125 of the flange 54 separates from the outer surface 82 of the fiber panel 44, facilitating movement of the airbag chute assembly 48 in a direction. The possibility of contact between the flange 54 and the fiber panel 44 during rotation of the door 60 is substantially reduced or eliminated.

According to an exemplary embodiment, the substrate is formed from a fiber panel in the embodiment; the substrate may be formed from other materials. According to an exemplary embodiment, the substrate may be formed from an injection-molded polymeric material and/or a stamped metal sheet, among other materials. According to an exemplary embodiment, the flange may be secured to the substrate by fasteners, by an adhesive bond and/or by press-fitting, among other connection systems. According to an exemplary embodiment, each connection system is configured to enable the flange to separate from the substrate upon contact between the airbag and the door to facilitate movement of the airbag chute assembly relative to the substrate.

According to an exemplary embodiment, the chute 52 includes a window W configured to receive a mounting structure 146. The mounting structure 146 may be configured to support the airbag chute assembly 48 and/or the vehicle trim component 140 within the vehicle interior. The window W facilitates movement of the airbag chute assembly 48 relative to the mounting structure 146 enabling the flange to separate from the fiber panel. A length L of the window W (and a generally corresponding length LX) may be selected to control movement of the airbag chute assembly 48 relative to the fiber panel 44. A longer window enables the airbag chute assembly 48 to move a greater distance during airbag deployment; a shorter window reduces the movement of the airbag chute assembly during airbag deployment. According to an exemplary embodiment, two windows W are provided (length L and a generally corresponding length LX); more or fewer windows may be provided according to an exemplary embodiment.

Figure 12:
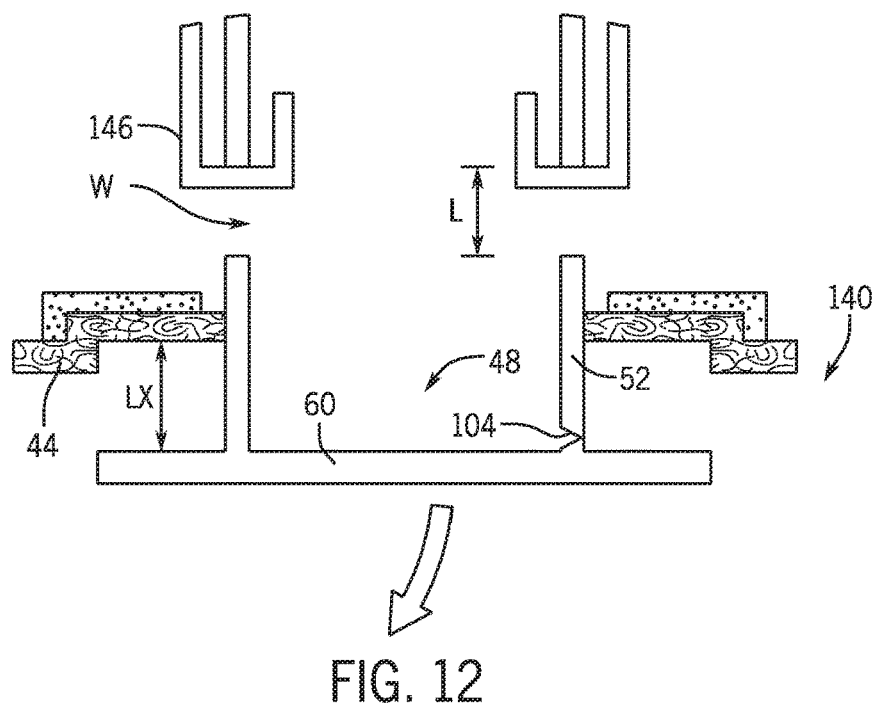
FIG. 12 is a schematic cross-sectional view of a vehicle trim component according to an exemplary embodiment.

FIG. 12 is a schematic cross-sectional view of the vehicle trim component 140 of FIG. 11, in which the airbag chute assembly 48 is separated from the fiber panel 44. According to an exemplary embodiment, the door 60 is coupled to the chute 52 by a weakened connection 104 to facilitate airbag deployment. The airbag deploys; contact between the airbag and the door 60 induces the airbag chute assembly 48 to move in the direction a distance (e.g. corresponds to the length L of the window W). If the vehicle trim component 140 includes a cover stock, movement of the airbag chute assembly 48 may deform, displace and/or tear the cover stock. Upon contact between the mounting structure 146 and the chute 52, movement of the airbag chute assembly 48 in the direction is blocked. Continued deployment of the airbag induces the door 60 to separate from the chute 52 along the weakened connection 104, facilitating rotation of the door 60 in the direction.

According to an exemplary embodiment, one weakened connection 104 is provided; additional weakened connections may be provided between the door 60 and the chute 52. According to an exemplary embodiment, the chute 52 may provide four sides (e.g. be four-sided); three of the sides may include weakened connections. The door may remain attached to the chute by the remaining side after airbag deployment.

FIG. 13 is a schematic cross-sectional view of the vehicle trim component 140 of FIG. 11, in which the door 60 of the airbag chute assembly 48 is separated from the chute 52 along the weakened connection 104. Contact between the airbag and the door 60 induces the door to rotate in the direction facilitating deployment of the airbag. If the cover stock is not torn by movement of the airbag chute assembly 48 in the direction rotation of the door 60 tears the cover stock; enabling the airbag to deploy. According to an exemplary embodiment, the airbag chute assembly 48 moves a distance 149 in the direction before the door 60 rotates in the direction; the possibility of contact between the flange 54 and the fiber panel 44 is substantially reduced or eliminated. Airbag deployment may be enhanced and/or additional components (e.g. hinge provided between the door and the chute) may be obviated (e.g. eliminated).

FIG. 14 is a schematic cross-sectional view of an embodiment of a vehicle trim component 150 manufactured by injecting resin behind a fiber panel to form a mounting structure for an airbag module. See also FIGS. 14A and 14B. According to an exemplary embodiment, the vehicle trim component 150 includes the fiber panel 44 and a resin mounting structure 152 injection molded onto the rear surface 88 of the fiber panel 44. The resin mounting structure 152 is configured to directly support an airbag module obviating the airbag chute assembly. The manufacturing costs and/or the complexity of the vehicle trim component may be reduced.

According to an exemplary embodiment, the resin mounting structure 152 includes an airbag module support section 154 and a fiber panel support section 156. The airbag module support section 154 is configured to secure the airbag module to the vehicle trim component and to direct the airbag toward the fiber panel 44 during airbag deployment. The fiber panel support section 156 is configured to enhance the structural rigidity of the fiber panel 44. The fiber panel support section 156 may include ribs or other structural members extending outwardly from the airbag module support section 154. The structural members may also form a geometric pattern (e.g. triangular, rectangular, hexagonal, etc.) along the rear surface 88 of the fiber panel 44 to enhance the structural rigidity of the vehicle trim component. According to an exemplary embodiment, the fiber panel support section 156 may be omitted and other structural elements may be employed to support the fiber panel 44.

A recess 158 is formed within the rear surface 88 of the fiber panel 44 to facilitate deployment of an airbag from the airbag module. According to an exemplary embodiment, the fiber panel 44 includes a door portion 160 extending between the resin mounting structure 152 and the recess 158. The door portion is configured to rotate in the direction upon deployment of the airbag. According to an exemplary embodiment, the airbag deploys; contact between the airbag and the door portion 160 of the fiber panel 44 induces the door portion 160 to separate from the fiber panel 44 along the recess 158; as the airbag drives the door portion 160 in the direction the airbag/door portion 160 tears an opening in the cover stock 94 facilitating airbag deployment. See FIGS. 14A and 14B. According to an exemplary embodiment, the fiber panel 44 includes a door portion 160, the process of forming a door within an element of the vehicle interior (e.g. by machining a groove within a rear surface of the instrument panel) is obviated (e.g. eliminated). The duration and costs associated with manufacturing the vehicle trim component may be reduced; according to an exemplary embodiment, the recess 158 is formed on the rear surface 88 of the fiber panel 44; the outer surface 82 of the fiber panel 44 may be substantially smooth, maintaining the smooth appearance of the vehicle trim component 150.

According to an exemplary embodiment, one recess 158 is provided; additional recesses surrounding the door portion 160 of the fiber panel 44. According to an exemplary embodiment, the door portion 160 may be four-sided and three of the sides may include corresponding recesses; the door portion 160 may remain attached to the fiber panel 44 by the remaining side after airbag deployment. A fabric support 162 may be utilized to retain the door portion 160 during deployment of the airbag. The fabric support 162 is coupled to the rear surface 88 of the fiber panel 44 by the resin mounting structure 152. According to an exemplary embodiment, as the resin mounting structure 152 is being formed by an injection molding process resin may flow through the fabric support to the rear surface 88 of the fiber panel 44 securing the fabric support to the fiber panel 44. A resin feature 164 may be injection molded onto the rear surface of the door portion 160 to secure the fabric support 162 to the door portion. According to an exemplary embodiment, resin may flow through the fabric support to the rear surface of the door portion as the resin feature is formed, securing the fabric support to the door portion. During deployment of the airbag the fabric support may function as a living hinge enabling the door portion to rotate in the direction while securing the door portion 160 to the vehicle trim component 150. According to an exemplary embodiment, the fabric support 162 may be formed from woven and/or non-woven fibers (e.g. glass fibers, carbon fibers, metal fibers, ceramic fibers and/or polymeric fibers, etc.).

According to an exemplary embodiment, a second resin feature 165 is injection molded within the recess 158 of the fiber panel 44. The second resin feature 165 is configured to secure the door portion 160 to the fiber panel 44 prior to deployment of the airbag. The second resin feature 165 may facilitate separation of the door portion 160 from the fiber panel 44 along the recess 158. According to an exemplary embodiment, the second resin feature 165 may be formed from a ductile material that enhances the separation, facilitating airbag deployment; the second resin feature 165 may extend from the rear surface 88 of the fiber panel 44 to the outer surface 82, connecting the door portion 160 to the fiber panel 44. According to an exemplary embodiment, the fabric support 162 may be coupled to the second resin feature 165 (e.g. via the injection molding process) to retain the second resin feature 165 during airbag deployment.

Figure 15:
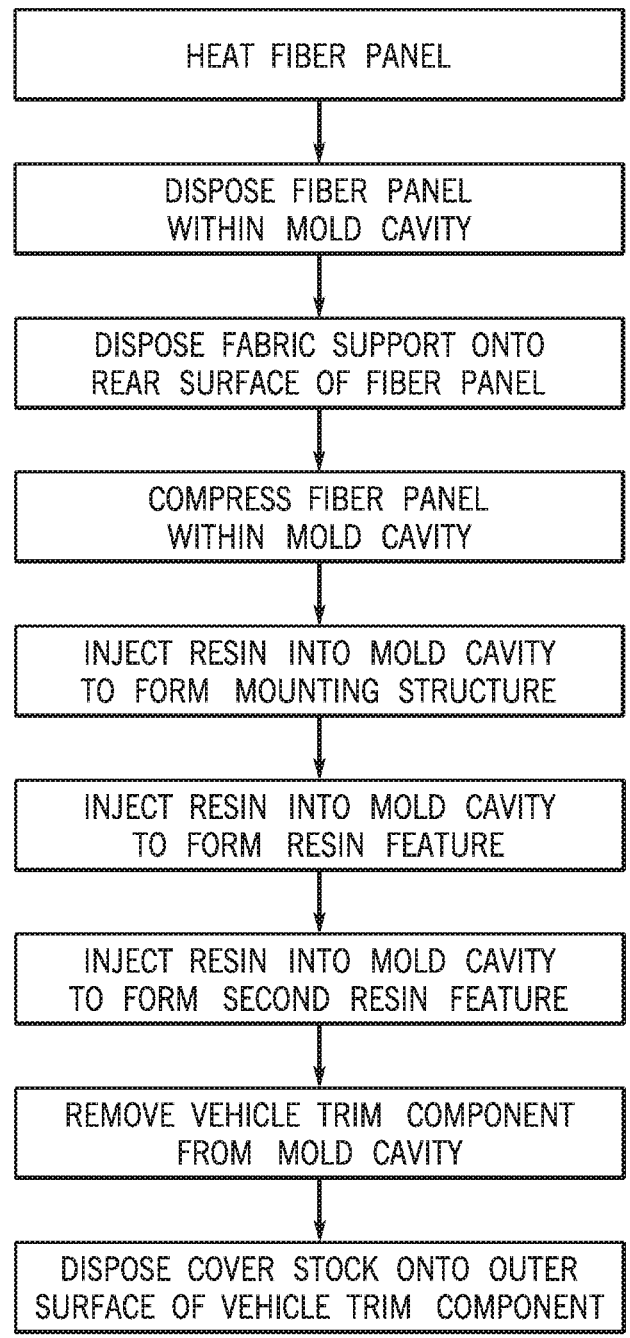
FIG. 15 is a schematic flow diagram of a method of manufacturing a vehicle trim component according to an exemplary embodiment.

FIG. 15 is a schematic flow diagram of an embodiment of a method of manufacturing a vehicle trim component by injecting resin behind a fiber panel to form a mounting structure for an airbag module. According to an exemplary embodiment, a fiber panel is heated. According to an exemplary embodiment, if the fiber panel includes thermoplastic resin, heating the panel softens the resin facilitating compression forming of the panel; the fiber panel is provided in a mold cavity. According to an exemplary embodiment, a fabric support is provided on the rear surface of the fiber panel; the fabric support is configured to retain the door portion of the fiber panel during deployment of the airbag.

As shown schematically, the fiber panel is compressed within the mold cavity to form the fiber panel into a desired shape; compressing the fiber panel forms a recess within the rear surface of the fiber panel. The recess is configured to facilitate deployment of the airbag from the airbag module. According to an exemplary embodiment, the recess is formed by a protrusion extending from the mold element that faces the rear surface of the fiber panel; as the fiber panel is compressed within the mold cavity the protrusion engages the rear surface of the fiber panel forming the recess.

Resin is then injected into the mold cavity to form a mounting structure on the rear surface of the fiber panel; the mounting structure is configured to support the airbag module, obviating a separate airbag chute assembly. According to an exemplary embodiment, the mounting structure may include an airbag module support section and a fiber panel support section. The fiber panel support section may include ribs configured to enhance the structural rigidity of the fiber panel. The ribs may extend outwardly from the airbag module support section and/or around the airbag module support section. According to an exemplary embodiment, in the vehicle trim component with a fabric support resin may be injected into the mold cavity to form a resin feature on the rear surface of the door portion of the fiber panel; the resin feature is configured to secure the fabric support to the door portion. During the injection molding process resin may flow through the fabric support to the rear surface of the door portion securing the fabric support to the door portion.

According to an exemplary embodiment, resin is injected into the mold cavity to form the second resin feature; the second resin feature may secure the door portion to the fiber panel prior to deployment of the airbag and/or facilitate separation of the door portion from the fiber panel along the recess. According to an exemplary embodiment, a cover stock may be provided on an outer surface of the trim component to aesthetically enhance a show surface of the component. According to an exemplary embodiment, the vehicle trim component is removed from the mold cavity. A cover stock is then provided on the outer surface of the component to form the show surface.

According to an exemplary embodiment, a single mold cavity may be utilized to compress the fiber panel and to facilitate injection molding of the resin components; the fiber panel may be compressed within a first mold cavity and then transferred to a second mold cavity to facilitate injection molding of the resin components.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

While only certain features and embodiments of the invention have been illustrated and described, many modifications and changes may occur to those skilled in the art (e.g. variations in sizes, dimensions, structures, shapes and proportions of the various elements, values of parameters (e.g. temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication and manufacture for those of ordinary skill having the benefit of this disclosure, without undue experimentation.

The invention claimed is:

1. A trim component for a vehicle interior configured to support an airbag module providing an airbag configured to be deployed through an opening into the vehicle interior comprising:
   (a) a panel comprising a first material and providing a front side and a back side; and
   (b) a structure formed from a second material molded on the back side of the panel;
   wherein the panel comprises a compression-formed component;

wherein the compression-formed component is configured to provide the opening through a door established upon deployment of the airbag to facilitate deployment of the airbag;
  wherein the structure is configured to support the airbag module and to direct the airbag toward the door during deployment of the airbag; and
  wherein the compression-formed component comprises a feature formed within the panel configured to establish the opening at the door to be created by the airbag at the feature upon deployment of the airbag from the airbag module so that the airbag will deploy through the compression-formed component at the opening.

2. The trim component of claim 1 wherein the feature comprises a recess formed within the panel configured to facilitate deployment of the airbag.

3. The trim component of claim 2 wherein the recess is formed in the back side of the panel.

4. The trim component of claim 2 wherein the feature comprises a resin feature injection molded within the recess configured to facilitate deployment of the airbag.

5. The trim component of claim 1 wherein the door extends between the structure and the feature formed within the panel.

6. The trim component of claim 1 wherein contact between the airbag and the door induces the door to establish the opening in the compression-formed component along the feature formed within the panel.

7. The trim component of claim 1 further comprising a support coupled to the compression-formed component and the structure; wherein the support is configured to secure the door to the compression-formed component during deployment of the airbag.

8. The trim component of claim 7 wherein the support is comprised of at least one of (a) fabric, (b) woven fibers, (c) non-woven fibers, (d) glass fibers, (e) carbon fibers, (f) metal fibers, (g) ceramic fibers, (h) polymeric fibers.

9. The trim component of claim 7 wherein the support comprises a resin feature configured to secure the support to the door.

10. The trim component of claim 1 wherein the structure is configured to secure the airbag module to the vehicle trim component; and wherein the structure is configured to reinforce the compression-formed component.

11. The trim component of claim 1 wherein the structure is configured to enhance the structural rigidity of the compression-formed component.

12. The trim component of claim 1 wherein the structure comprises at least one rib.

13. The trim component of claim 1 wherein the panel is formed at least partially from fibers.

14. The trim component of claim 1 further comprising a cover to provide a surface on the compression-formed component.

15. The trim component of claim 14 wherein contact between the airbag and the door induces tearing of the cover to establish the opening for the airbag and to facilitate deployment of the airbag through the opening.

16. A trim component for a vehicle interior configured to support an airbag module providing an airbag for deployment through an opening into the vehicle interior prepared using a mold by a process comprising the steps of:
  (a) disposing a fiber panel onto a first surface of the mold;
  (b) compressing the fiber panel between the first surface and a second surface of the mold to form the fiber panel into a compression-formed component having a shape; and
  (c) forming a structure on a side of the compression-formed component;
  wherein the shape corresponds to a first contour of the first surface and a second contour of the second surface; and
  wherein the structure is configured to support the airbag module and to direct the airbag toward the compression-formed component to establish the opening during deployment of the airbag.

17. The trim component of claim 16 wherein forming the structure on a side of the compression-formed component comprises injecting resin into the mold.

18. The trim component of claim 16 wherein compressing the fiber panel between the first surface and a second surface of the mold comprises forming a recess within a surface of the fiber panel; wherein the recess is configured to facilitate deployment of the airbag.

19. The trim component of claim 16 wherein the process further comprises the step of providing a fabric support on a side of the fiber panel; wherein the fabric support is configured to reinforce the compression-formed component.

20. A method of manufacturing a vehicle trim component configured to support an airbag module providing an airbag for deployment from the airbag module through an opening into the vehicle interior comprising the steps of:
  (a) providing a fiber panel on a first surface of a mold;
  (b) compressing the fiber panel between the first surface and a second surface of the mold to form the fiber panel into a compression-formed component having a shape; and
  (c) injecting resin into the mold to form a structure on a side of the compression-formed component;
  wherein the shape corresponds to a first contour of the first surface and a second contour of the second surface; and
  wherein the structure is configured to support the airbag module and to direct the airbag toward the compression-formed component to establish the opening during deployment of the airbag.

* * * * *